(12) United States Patent
Kei (10) Patent No.: US 8,508,658 B2
(45) Date of Patent: Aug. 13, 2013

(54) ELECTRONIC APPARATUS

(75) Inventor: Hidetoshi Kei, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 125 days.

(21) Appl. No.: 13/071,407

(22) Filed: Mar. 24, 2011

(65) Prior Publication Data
US 2011/0234891 A1 Sep. 29, 2011

(30) Foreign Application Priority Data

Mar. 26, 2010 (JP) ................................ 2010-071938

(51) Int. Cl.
*H04N 5/225* (2006.01)
(52) U.S. Cl.
USPC ........................................................ 348/373
(58) Field of Classification Search
USPC ............... 348/373, 240.99; 396/85, 419, 428
See application file for complete search history.

(56) References Cited

U.S. PATENT DOCUMENTS

| | | | | |
|---|---|---|---|---|
| 5,684,640 A | * | 11/1997 | Tanaka et al. ................. | 359/694 |
| 7,208,905 B2 | * | 4/2007 | Shibatani ..................... | 318/696 |
| 7,679,670 B2 | * | 3/2010 | Tsai .............................. | 348/360 |
| 7,782,559 B2 | * | 8/2010 | Huang et al. ................. | 359/824 |
| 2006/0056058 A1 | * | 3/2006 | Chong et al. ................. | 359/694 |
| 2006/0209205 A1 | * | 9/2006 | Tsai .............................. | 348/373 |
| 2007/0217029 A1 | * | 9/2007 | Kato ............................. | 359/694 |
| 2008/0174690 A1 | * | 7/2008 | Chang .......................... | 348/345 |
| 2011/0007202 A1 | * | 1/2011 | Chiang ......................... | 348/345 |

FOREIGN PATENT DOCUMENTS

JP 2008-203632 A 9/2008

* cited by examiner

*Primary Examiner* — Aung S Moe
*Assistant Examiner* — Amy Hsu
(74) *Attorney, Agent, or Firm* — Canon USA Inc IP Division (57) ABSTRACT

An electronic apparatus includes an operation member which can be rotated and operated in two directions from a neutral position, a holding member configured to rotatably hold the operation member, a rotation limiting member configured to limit a rotational range of the operation member by abutting the operation member, an elastic member having a first portion which is fixed to the holding member and a second portion which engages with a part of the operation member and configured to elastically deform by rotating the operation member from the neutral position, and an abutment member configured to abut the second portion of the elastic member before the rotation limiting member limits the rotational range of the operation member.

9 Claims, 7 Drawing Sheets

ELECTRONIC APPARATUS

BACKGROUND OF THE INVENTION

1. Field of the Invention

The present invention relates to an operation member in an electronic apparatus, and more specifically, to an operation member in an imaging device such as a digital camera.

2. Description of the Related Art

Recently, digital cameras are becoming more and more sophisticated. In addition to capturing still images, increasingly digital cameras have a function for capturing moving images. In the past, when a zoom operation was performed when capturing a moving image in a digital camera, the operation was performed by starting moving image capturing and then operating a zoom operation member.

As discussed in Japanese Patent Application Laid-Open No. 2008-203632, a conventional zoom operation member is configured so that a rotatable operation member is held in a neutral position by a spring, whereby the operation member can be operated as far as the position of the rotating edge against the spring by a user operating the operation member.

However, because the operation member discussed in Japanese Patent Application Laid-Open No. 2008-203632 is positioned by the user abutting a part of the operation member against a holding member when rotating the operation member during a zoom operation, a collision sound is produced during operation.

Further, this operation member is configured to return to the neutral position by a return spring if the user releases the operation member. While the operation member is being returned to the neutral position by the return spring, a vibration sound is also produced due to the spring scraping against a rotating movement member and self-oscillating.

When capturing a moving image, there is a problem that such sounds produced from the operation member are recorded.

SUMMARY OF THE INVENTION

According to an aspect of the present invention, an electronic apparatus includes an operation member which can be rotated and operated in two directions from a neutral position, a holding member configured to rotatably hold the operation member, a rotation limiting member configured to limit a rotational range of the operation member by abutting the operation member, an elastic member having a first portion which is fixed to the holding member and a second portion which engages with the operation member, and configured to elastically deform by rotating the operation member from the neutral position, and an abutment member configured to abut the second portion of the elastic member before the rotation limiting member limits the rotational range of the operation member.

According to the present invention, an electronic apparatus can be provided which mitigates the operational sounds (sound of collisions and vibrations) when the user operates an operation member.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

A digital camera 100, which is an example of an electronic apparatus in which the present invention is applied, will be described using FIGS. 1 to 5.

Figure 1:
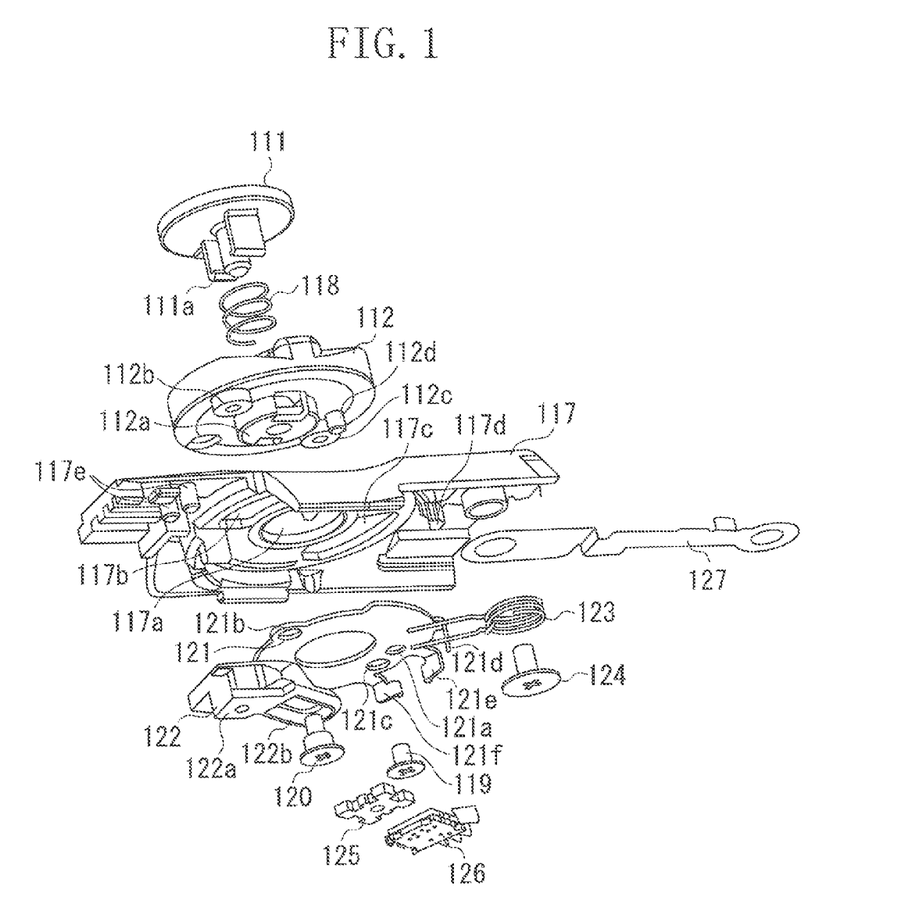
FIG. 1 is an exploded perspective diagram illustrating a configuration near a zoom lever of a digital camera 100.

FIG. 1 is an exploded perspective diagram illustrating a configuration near a zoom lever of the digital camera 100.

A release button 111 is an operation member for performing imaging preparation and for starting imaging by being pressed. The release button 111 is attached to a zoom lever 112. A release spring 118 is arranged between the release button 111 and the zoom lever 112. The release spring 118 applies an urging force in a direction in which the zoom lever 112 and the release button 111 are moved apart.

Therefore, when the release button 111 is pressed, against the urging force of the release spring 118, the release button 111 is made to stroke the zoom lever 112. A boss 111a is formed on the release button 111. By pressing the release button 111, this boss 111a is made to protrude from the zoom lever 112, whereby a release switch 125 is turned on.

A top cover 117 is an exterior member arranged on an upper face of the digital camera. The top cover 117 functions as a holding member for rotatably holding the zoom lever 112 to which the release button 111 is attached. On the top cover 117 are formed a circular opening 117a, which serves as the rotational center of the zoom lever 112, and circular arc shape openings 117b and 117c formed around the periphery of the circular opening 117a.

On the zoom lever 112 are formed a cylindrical member 112a, bosses 112b and 112c on which a screw seat is formed, and a positioning pin 112d. The zoom lever 112 is arranged on the top cover 117 so that the cylindrical member 112a is positioned in the opening 117a, the boss 112b is positioned in the opening 117b, and the boss 112b and the positioning pin 112d are positioned in the opening 117b, respectively.

By fixing a zoom plate 121 on the zoom lever 112, the top cover 117 is sandwiched between the zoom lever 112 and the zoom plate 121, so that the zoom lever 112 is attached to the top cover 117.

On the zoom plate 121 are formed a positioning hole 121a and screw holes 121b and 121c. When fixing the zoom plate 121 to the zoom lever 112, the positioning pin 112d is inserted into the positioning hole 121a, and the position of the boss 112b screw seat is aligned with the screw hole 121b, and the position of the boss 112c screw seat is aligned with the screw hole 121c. A fastening screw 119 is screwed into the boss 112c screw seat, and a stepped screw 120 is screwed into the boss 112c screw seat.

Consequently, the zoom plate 121 is fixed to the zoom lever 112. In the present exemplary embodiment, the zoom lever 112 functions as a lever member and the zoom plate 121 functions as a plate member. Further, the integrally-formed zoom lever 112 and zoom plate 121 function as an operation member that can be rotated and operated in two directions from the neutral position.

The rotational range of the zoom lever 112 is from the position where the boss 112b abuts an edge (a first edge) of the opening 117b of the top cover 117 to the position where the boss 112b abuts the other edge (a second edge) of the opening 117b of the top cover 117. Therefore, in the present exemplary embodiment, the opening 117b formed on the top cover 117 functions as a rotation limiting member that limits the rotational range of the operation member.

On the zoom plate 121 are formed a spring hook 121d onto which a zoom spring 123 is hooked and abutment members 121e and 121f that abut an arm 126a of zoom switch 126. On the top cover 117 is formed a protrusion 117d that abuts the zoom spring 123.

The zoom spring 123, which is a spring member that urges the zoom lever 112 toward the neutral position, is arranged so that its two arms sandwich the spring hook 121d of the zoom plate 121 and the protrusion 117d of the top cover 117. The zoom spring 123 is fixed to the top cover 117 by a screw 124.

When fixing the zoom spring 123 to the top cover 117, a ground plate 127 is fitted in between the zoom spring 123 and the top cover 117. The ground plate 127 is connected with a ground potential section in the digital camera. Therefore, the zoom spring 123, the zoom plate 121, the fastening screw 119, the stepped screw 120, and the screw 124 are set to be the ground potential.

A zoom rubber 122 is arranged as an elastic member so that a fixing member 122a, which is a first portion formed on one side, is fixed to a boss 117e formed on the top cover 117, and a U-shaped member 122b, which is a second portion formed on the other side, covers the periphery of the stepped screw 120. Therefore, the U-shaped member 122b of the zoom rubber 122 has a U shape, and engages with the integrally-formed zoom lever 112 and zoom plate 121 that function as an operation member.

If the zoom lever 112 is rotated, before the boss 112b abuts an edge (first edge) of the opening 117b of the top cover 117, the U-shaped member 122b covering the periphery of the stepped screw 120 abuts an abutment member 117f or 117g of the top cover 117. In the present exemplary embodiment, the abutment member 117f or 117g of the top cover 117 functions as an abutment member.

The release switch 125 and the zoom switch 126 are mounted on a flexible substrate (not illustrated), overlapping the zoom plate 121.

Figure 2A:
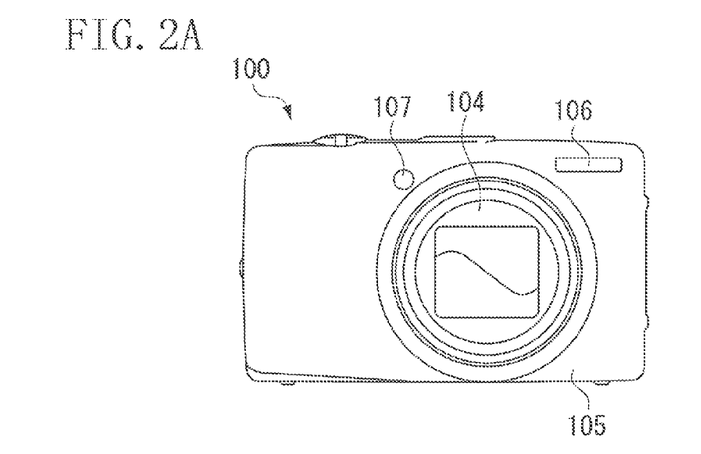
FIGS. 2A to 2F illustrate an appearance of the digital camera 100.
Figure 2B:
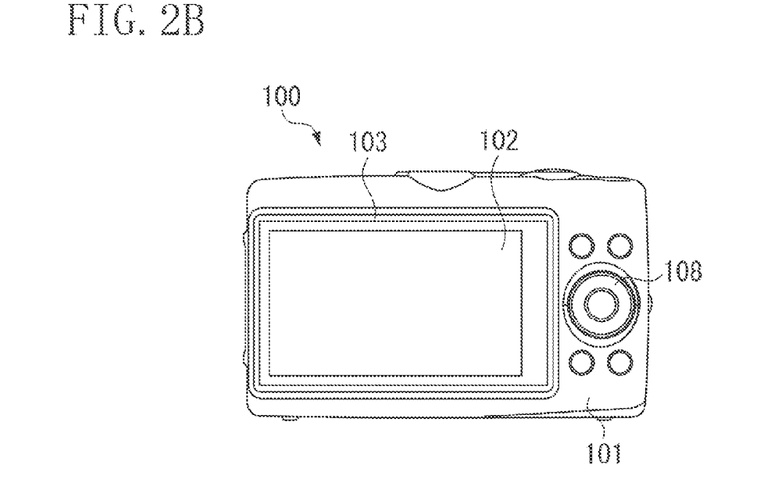

FIGS. 2A and 2B illustrate an appearance of the digital camera 100.

Figure 2C:
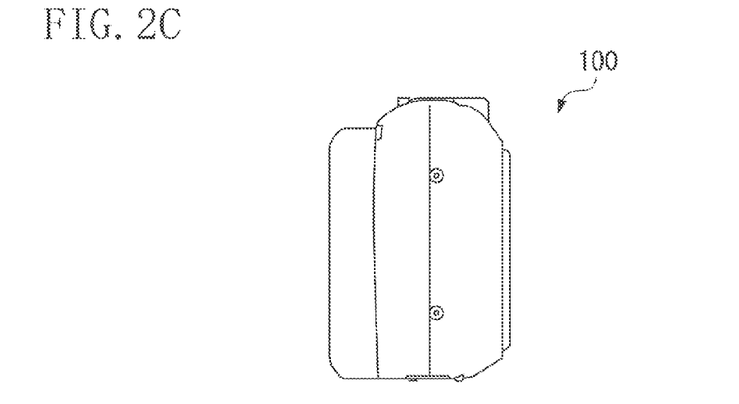
Figure 2D:
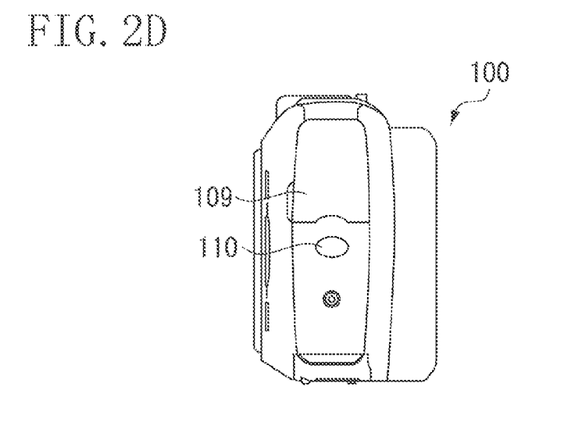
Figure 2E:
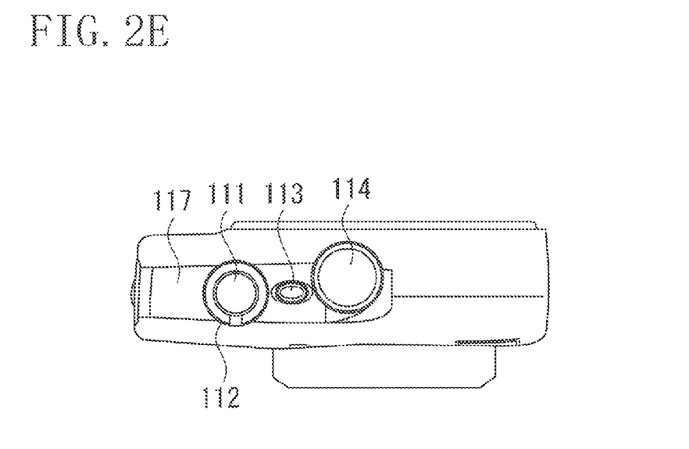
Figure 2F:
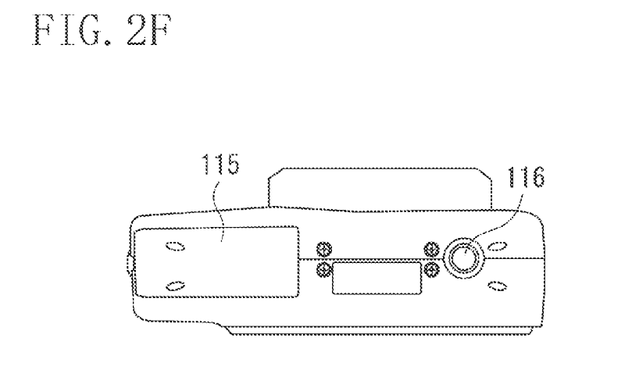

FIG. 2A is a front view of the digital camera 100, and FIG. 2B is a rear view of the digital camera 100. FIG. 2C is a right side view of the digital camera 100, and FIG. 2D is a left side view of the digital camera 100. FIG. 2E is a top view of the digital camera 100, and FIG. 2F is a bottom view of the digital camera 100.

In FIG. 2A, a lens barrel 104 forms an imaging optical system. A front cover 105 is an exterior member that covers the front face of the digital camera 100. A flash 106 and an autofocus (AF) auxiliary light window 107 are arranged on the front face of the digital camera 100.

In FIG. 2B, a rear face cover 101 is an exterior member that covers the body rear face. A protection window 102 protects a liquid crystal panel. An intermediate member 103 holds the protection window 102 and is fixed to the rear face cover 101. An operating button group 108 is configured from a center button and peripheral buttons, which are used when performing various settings during imaging and image playback.

In FIG. 2C, a connector cover 109 protects the terminals provided for connection to various external devices. The digital camera 100 according to the present exemplary embodiment includes terminals such as an analog video terminal, a power terminal, and a universal serial bus (USB) terminal. A strap base 110 has a hole for passing a strap through.

In FIG. 2E, the user performs imaging preparation and starts imaging by operating the release button 111. By operating the zoom lever 112, the user optically or electronically changes the magnification of an object image. By operating the power button 113, the user turns the power source of the digital camera 100 on/off. By operating a mode dial 114, the user sets an imaging mode. The top cover 117 is an exterior member that covers the upper face of the digital camera 100. As described above, the zoom lever 112 is attached to the top cover 117.

In FIG. 2F, a battery cover 115 covers a battery compartment of the digital camera 100. A tripod hole 116 is a hole for fixing the digital camera 100 to a tripod.

The state when the zoom lever 112 is operated will now be described referring to FIGS. 3A, 3B, 3C, 4A, and 4B.

Figure 3A:
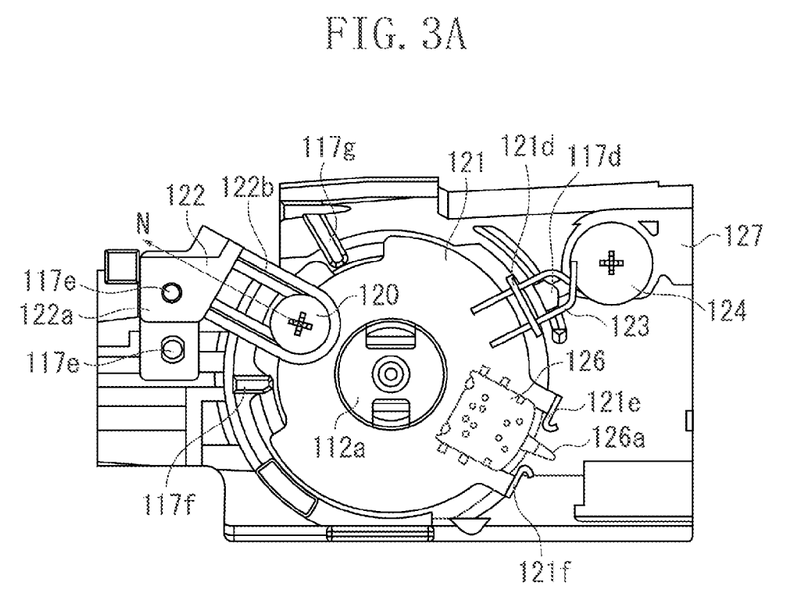
FIGS. 3A to 3C each illustrate a state when a zoom lever 112 is operated.

FIG. 3A illustrates a state in which the zoom lever 112 has not been operated, specifically, a state in which the zoom lever 112 is in the neutral position.

As illustrated in FIG. 3A, in this state, the zoom spring 123 sandwiches the spring hook 121d of the zoom plate 121 and the protrusion 117d of the top cover 117 with both of two arms thereof. Further, neither of the abutment members 121e or 121f of the zoom plate 121 abut the arm 126a of the zoom switch 126.

In this state, the U-shaped member 122b of the zoom rubber 122 is pulling the stepped screw 120 in the direction of the arrow N in FIG. 3A. Due to this pulling force, the zoom plate 121 is held in the neutral position. More specifically, when the zoom lever 112 is at the neutral position, the U-shaped member 122b of the zoom rubber 122 is applying a force on the zoom plate 121 in a direction that is approximately orthogonal to the direction in which the zoom lever 112 is operated.

Figure 3B:
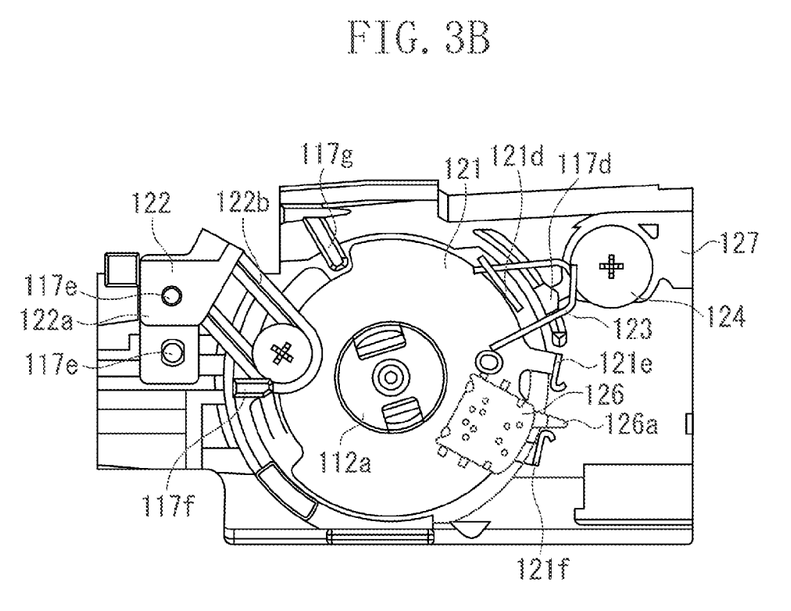

FIG. 3B illustrates a state in which, from the state illustrated in FIG. 3A, the zoom lever 112 has been rotated in an anticlockwise direction, so that the boss 112b abuts an edge (first edge) of the opening 117b of the top cover 117.

From the state illustrated in FIG. 3A, if the zoom lever 112 is rotated in an anticlockwise direction, by rotating the zoom plate 121 along with the zoom lever 112, the position of the spring hook 121d changes. Specifically, in a state in which one of the arms of the zoom spring 123 is caught by the protrusion 117d, the other arm of the zoom spring 123 is elastically deformed by the spring hook 121d.

The zoom spring 123 produces an urging force in the direction that narrows the distance between its two arms. Therefore, as the distance between the two arms widens, the urging force increases. Consequently, the more the rotation amount of the zoom lever 112 increases, the greater the force for returning to the neutral position. FIG. 3B illustrates a state in which the urging force is at its greatest.

From the state illustrated in FIG. 3A, if the zoom lever 112 is rotated in an anticlockwise direction, the abutment member 121f of the zoom plate 121 abuts the arm 126a of the zoom switch 126, and pushes the arm 126a over. Consequently, the zoom switch 126 outputs a signal to enlarge the object image.

Figure 4A:
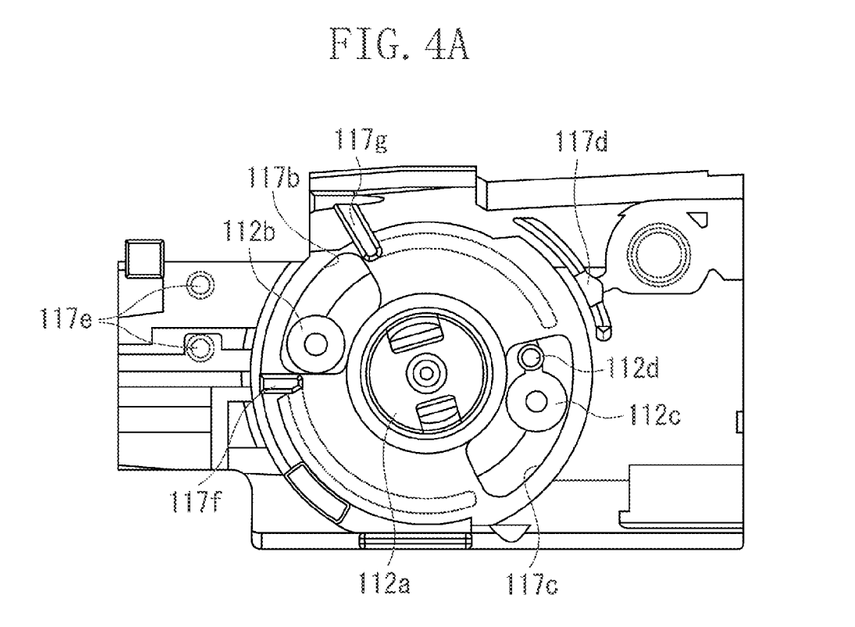
FIGS. 4A and 4B each illustrate a state when the zoom lever 112 is operated.

FIG. 4A illustrates a state in which, in the state illustrated in FIG. 3B, the zoom switch 126, the zoom rubber 122, the zoom spring 123, the screw 124, and the zoom plate 121 have been removed. In the state illustrated in FIG. 3B, as illustrated in FIG. 4A, the boss 112b is in a state abutting an edge (first edge) of the opening 117b of the top cover 117.

In the state illustrated in FIG. 3B, although the boss 112b is in a state of abutting an edge (first edge) of the opening 117b of the top cover 117, prior to that, the U-shaped member 122b, which is wound around the periphery of the stepped screw 120, abuts the abutment member 117f of the top cover 117. Since the boss 112b abuts an edge (first edge) of the opening 117b after the U-shaped member 122b abuts the abutment member 117f, the collision of the boss 112b abutting the edge of the opening 117b can be mitigated, enabling the collision sound to be reduced.

Further, when in the state illustrated in FIG. 3B, if operation of the zoom lever 112 is released, due to the urging force of the zoom spring 123 and the restoring force of the zoom rubber 122, the zoom plate 121 returns to the state illustrated in FIG. 3A. At this stage, the zoom plate 121 vibrates near the neutral position, and then returns to the state illustrated in FIG. 3A. More specifically, due to the urging force of the zoom spring 123 and the restoring force of the zoom rubber 122, the zoom plate 121 is rotated clockwise to a position beyond the neutral position.

Next, due to the urging force of the zoom spring 123 and the restoring force of the zoom rubber 122, the zoom plate 121 is rotated anticlockwise. When the zoom lever 112 returns to the neutral position, the zoom plate 121 vibrates in such a manner near the neutral position. At this stage, the arms of the zoom spring 123 and the spring hook 121d repeatedly collide, thereby producing a collision sound.

In the present exemplary embodiment, by providing the zoom rubber 122, the vibrations can be quickly made to converge. Specifically, due to the U-shaped member 122b of the zoom rubber 122 pulling the stepped screw 120 in the direction of the arrow N in FIG. 3A, the U-shaped member 122b is functioning as a damper for dampening vibrations.

Figure 3C:
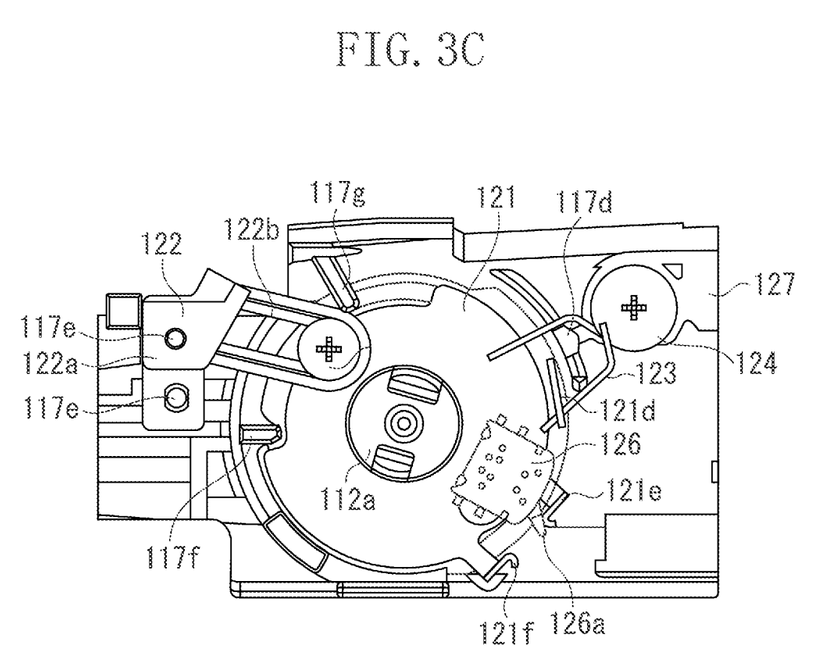

Similarly, FIG. 3C illustrates, from the state illustrated in FIG. 3A, a state in which the zoom lever 112 has been rotated in a clockwise direction, so that the boss 112b abuts an edge (first edge) of the opening 117b of the top cover 117. More specifically, from the state illustrated in FIG. 3A, if the zoom lever 112 is rotated in a clockwise direction, in a state in which one of the arms of the zoom spring 123 is caught by the protrusion 117d, the other arm of the zoom spring 123 is elastically deformed by the spring hook 121d.

As the distance between the two arms of the zoom spring 123 widens, the urging force increases, reaching a maximum in the state illustrated in FIG. 3C. From the state illustrated in FIG. 3A, if the zoom lever 112 is rotated in a clockwise direction, the abutment member 121e of the zoom plate 121 abuts the arm 126a of the zoom switch 126, and pushes the arm 126a over. Consequently, the zoom switch 126 outputs a signal to reduce the object image.

Figure 4B:
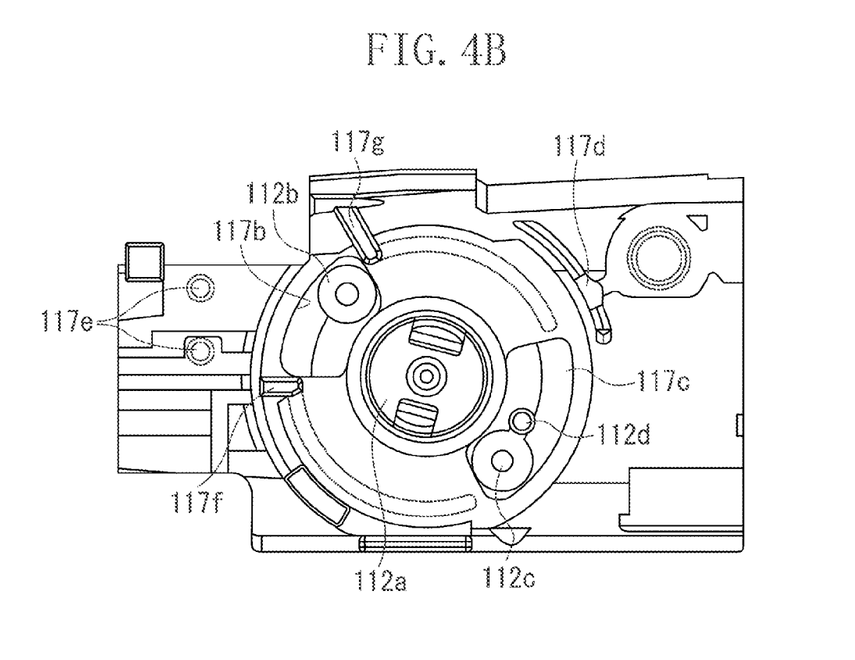

FIG. 4B illustrates a state in which, in the state illustrated in FIG. 3C, the zoom switch 126, the zoom rubber 122, the zoom spring 123, the screw 124, and the zoom plate 121 have been removed. In the state illustrated in FIG. 3C, as illustrated in FIG. 4B, the boss 112b is in a state of abutting an edge (first edge) of the opening 117b of the top cover 117.

In the state illustrated in FIG. 3C, the U-shaped member 122b, which is wound around the periphery of the stepped screw 120, abuts the abutment member 117g of the top cover 117, and then the boss 112b abuts the other edge (second edge) of the opening 117b of the top cover 117. Therefore, the collision of the boss 112b abutting an edge (first edge) of the opening 117b can be mitigated, enabling the collision sound to be reduced.

Further, when returning from the state illustrated in FIG. 3C to the state illustrated in FIG. 3A, the operation that the zoom rubber 122 dampens the vibrations of the zoom plate 121 is the same as described above.

Figure 5:
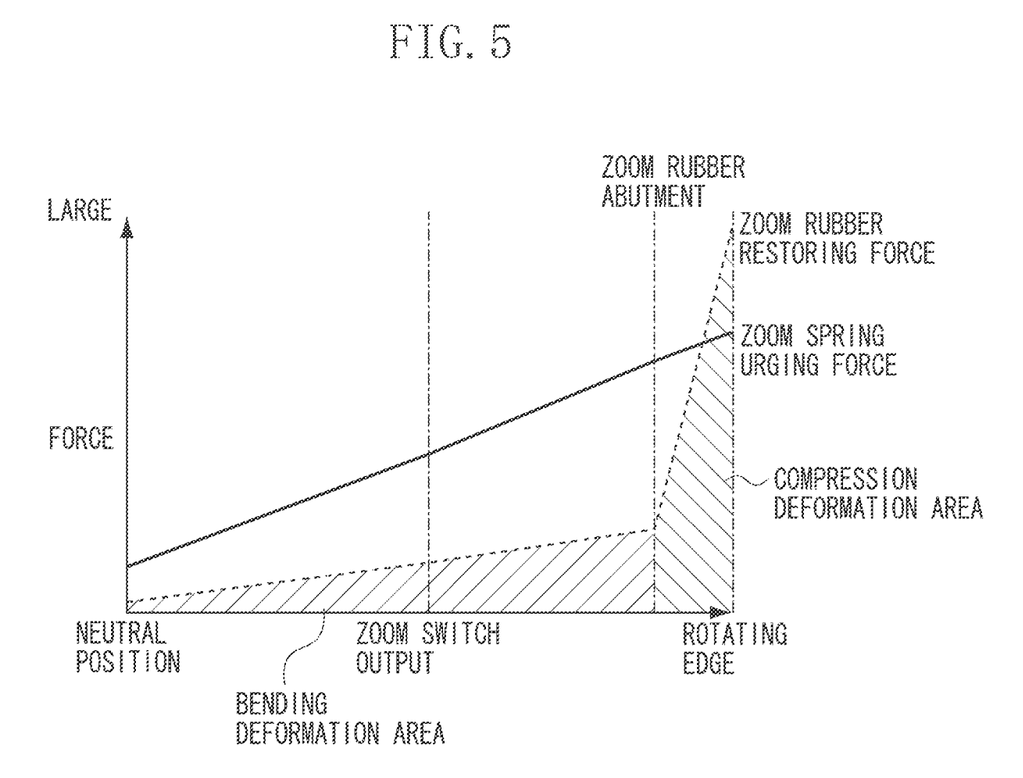
FIG. 5 is a graph illustrating a state of deformation of a zoom rubber 122 and a zoom spring 123 when the zoom lever 112 is rotated.

FIG. 5 is a graph illustrating a state of deformation of the zoom rubber 122 and the zoom spring 123 when the zoom lever 112 is rotated.

As the rotation amount of the zoom lever 112 increases from the neutral position, the urging force of the zoom spring 123 evenly increases, and reaches a maximum value at the states illustrated in FIG. 3B or 3C.

On the other hand, near the neutral position, the zoom rubber 122 is elastically deformed by a smaller elastic modulus than the zoom spring 123. During the period while the zoom rubber 122 is elastically deformed by a smaller elastic modulus, the zoom switch 126 outputs a signal.

Subsequently, when the zoom lever 112 abuts the abutment member 117f or 117g of the top cover 117, the U-shaped member 122b of the zoom rubber 122 starts compressive deformation, and is elastically deformed by a larger elastic modulus than the zoom spring 123. The maximum compression amount is reached in the states illustrated in FIG. 3B or 3C in which rotation is limited.

Thus, between the states illustrated in FIGS. 3B and 3C in which rotation from the neutral position is limited, the zoom rubber 122 has two areas, a bending deformation area and a compression deformation area. After the zoom switch 126 outputs a signal, the deformation area of the zoom rubber 122 switches from the state illustrated in FIG. 3B or 3C in which rotation is limited to the previous state.

Consequently, if the zoom lever 112 is operated, the operation force becomes heavier after the zoom switch 126 has output the signal, so that kinetic energy is absorbed between the state in which rotation is limited illustrated in FIG. 3B or 3C and the state in which the zoom lever 112 is rotated, so that a collision sound is prevented from being produced.

Thus, in the present exemplary embodiment, during rotation of the zoom lever 112, a collision sound is mitigated by causing the zoom rubber 122 to compressively deform. Further, during restoration of the zoom lever 112, the vibration sound of the zoom plate 121 is dampened and mitigated by the force for holding the zoom lever 112 in the neutral position of the zoom rubber 122. Consequently, operation sounds produced during operation of the zoom lever 112 are mitigated, so that unnecessary sounds can be prevented from being recorded when capturing a moving image.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-071938 filed Mar. 26, 2010, which is hereby incorporated by reference herein in its entirety.

What is claimed is:

1. An electronic apparatus, comprising:
   an operation member which can be rotated and operated in two directions from a neutral position;
   a holding member configured to rotatably hold the operation member;
   a fixed member fixed to the operation member so that the holding member is sandwiched between the fixed member and the operation member; and an elastic member having a first portion which is fixed to the holding member and a second portion which engages with the fixed member wherein a projection portion is formed on the fixed member, wherein a part of the second portion surrounds a periphery of the projection portion, and wherein in case when the operation member is rotated from the neutral position, the second portion abuts an abutment part which is formed on the holding member so that the projection portion does not contact the abutment part.

2. The electronic apparatus according to claim 1, further comprising a spring member configured to urge the operation member toward the neutral position.

3. The electronic apparatus according to claim 1, wherein an opening formed on the holding member, and the rotational range of the operation member is limited by inserting a boss formed on the operation member into the opening.

4. The electronic apparatus according to claim 3, wherein in a case when the rotational range of the operation member is limited, the second portion of the elastic member is compressively deformed between the abutment part and the operation member.

5. The electronic apparatus according to claim 1, wherein the fixed member is fixed by a screw to the operation member, and wherein the screw projects from the fixed member, and the projection portion is formed by the screw.

6. The electronic apparatus according to claim 1, wherein the second portion of the elastic member is configured to apply a force on the operation member in a direction approximately orthogonal to a direction in which the operation member is operated when the operation member is in the neutral position.

7. An electronic apparatus, comprising:

an operation member which can be rotated and operated in two directions from a neutral position;

a spring member configured to urge the operation member toward the neutral position;

a holding member configured to rotatably hold the operation member;

a rotation limiting member configured to limit a rotational range of the operation member by abutting the operation member;

an elastic member having a first portion which is fixed to the holding member and a second portion which engages with the operation member, wherein when the operation member is rotated from the neutral position, the second portion abuts an abutment part formed on the holding member before the rotation limiting member limits the rotational range of the operation member, and wherein the elastic member is configured to be elastically deformed by a smaller elastic modulus than a spring member when the operation member is in the neutral position, and be elastically deformed by a larger elastic modulus than the spring member when the rotation limiting member limits the rotational range of the operation member.

8. The electronic apparatus according to claim 7, wherein the rotation limiting member is an opening formed on the holding member, and the rotational range of the operation member is limited by inserting a boss formed on the operation member into the opening.

9. The electronic apparatus according to claim 7, wherein when the rotation limiting member limits the rotational range of the operation member, the second portion of the elastic member is compressively deformed between the abutment part and the operation member.

* * * * *